United States Patent [19]
Bole

[11] 3,975,272
[45] Aug. 17, 1976

[54] METHOD FOR RECOVERING PHASE COMPONENTS FROM A MIXTURE OF SOLIDS AND LIQUIDS

[75] Inventor: Claude E. Bole, Gary, Ind.

[73] Assignee: United States Steel Corporation, Pittsburgh, Pa.

[22] Filed: Dec. 23, 1974

[21] Appl. No.: 535,761

Related U.S. Application Data

[63] Continuation of Ser. No. 488,353, July 15, 1974, abandoned, which is a continuation of Ser. No. 288,451, Sept. 12, 1972, abandoned.

[52] U.S. Cl. .............................. 210/68; 23/302 A; 210/73 R
[51] Int. Cl.² ........................................ B01D 12/00
[58] Field of Search .......... 23/271, 272 AH, 273 R, 23/300, 302 A, 303; 210/66, 68, 71, 83, 199, 207, 511, 513, 73; 423/545

[56] References Cited
UNITED STATES PATENTS

| | | | |
|---|---|---|---|
| 2,794,832 | 6/1957 | Rietema | 210/66 |
| 2,914,518 | 11/1959 | Cottle | 210/66 |
| 3,390,402 | 6/1968 | Goerg | 23/272 AH |
| 3,826,740 | 7/1974 | Jewett | 210/83 |

Primary Examiner—Charles N. Hart
Assistant Examiner—Ivars Cintins
Attorney, Agent, or Firm—John E. Callaghan

[57] ABSTRACT

A method is provided for recovery of the one of the phase components of a mixture of solids and liquids by introducing a condensable gas into the withdrawal line from a separator. This has particular usefulness as applied to the recovery of ammonium sulfate by washing of coke oven gases in which case the ammonium sulfate can, by centrifugation, be obtained with a moisture content of less than 1% by weight.

8 Claims, 7 Drawing Figures

METHOD FOR RECOVERING PHASE COMPONENTS FROM A MIXTURE OF SOLIDS AND LIQUIDS

This is a continuation of application Ser. No. 488,353, filed July 15, 1974, now abandoned, which is a continuation of Ser. No. 288,451, filed Sept. 12, 1972, now abandoned.

BACKGROUND OF THE INVENTION

In many industrial processes, a mixture of solids and liquids are produced which must be separated to recover either a solid or the liquid or both as the product of the process. Particularly in the case in which the solid is a crystallized salt obtained from supersaturating the liquid, e.g., sulfate salts, there is a substantial problem in separating the solid from the liquid, obtaining a solid with good material handling properties, and minimizing the amount of energy required to do so. Furthermore, if a solid is precipitated in too fine a particle size, then additional problems result in converting this to a suitable use. For example, mixed fertilizers using a sulfate salt with too fine a particle size segregate on blending and cause problems when spread by ground spreading equipment. In many instances, this fine particle size product must be first pelletized and then used in such spreading equipment. However, dust formation from the pellets is still a problem. In addition, because of the volume of materials involved in the production of heavy inorganic salts, the equipment must be as simple as possible and as reliable as possible for maintenance free use. A common solution to the problem of separating the liquids and the solids is to dry the solids as a partially dewatered mixture in such things as ovens. The oven drying is expensive and also may cause problems in the emission of fine particle dust. In addition, other processes such as water purification require particle classifying and drying of large volumes of sludges which may not necessarily be themselves a product but which must be removed from the water purification system. The cost of drying these solid materials for disposal or reuse is a substantial part of the overall treatment cost.

OBJECTS OF THE INVENTION

This invention has for its objectives the provision of a method for the recovery of at least one of the phase components of a mixture of solids and liquids which can be conducted by a simple operation which minimizes the outflow of liquids in the solid recovery sections. It also includes the provision of a relatively inexpensive means for achieving product which has a low liquid content in the solids, particularly low moisture contents. In another aspect, the invention is to provide an easily controlled process so that the solid product has a uniform size and/or a uniform composition. Furthermore, the solid product is to be abrasion resistant to minimize dust formation and possess good material handling properties such as freedom from caking. Especially, when treating crystallizable substances which are soluble in liquids, the invention is to provide optimum conditions for the growth, classification and recovery of the crystalline product from its mother liquor. It is also intended to achieve economies in the processing of these materials by eliminating the necessity of relying upon vaporization of liquid alone to yield a solid product with a liquid content suitable for the use or transportation or other disposition of this product. Moreover, it is intended to apply such advantages to solid aqueous liquid recovery systems in coke oven gas processes, flue gas cleaning, and water purification.

DESCRIPTION OF THE INVENTION AND FIGURES

By the practice of this invention, mixtures of solids and liquid may be separated by introducing a condensable gas at a point adjacent to a separation zone and downstream of the point of solids from this separation zone. The introduction of condensable gas in said withdrawal line will retard liquid flow from said separation zone and as a consequence thereof will cause particle classification in said separation zone.

Figure 1:
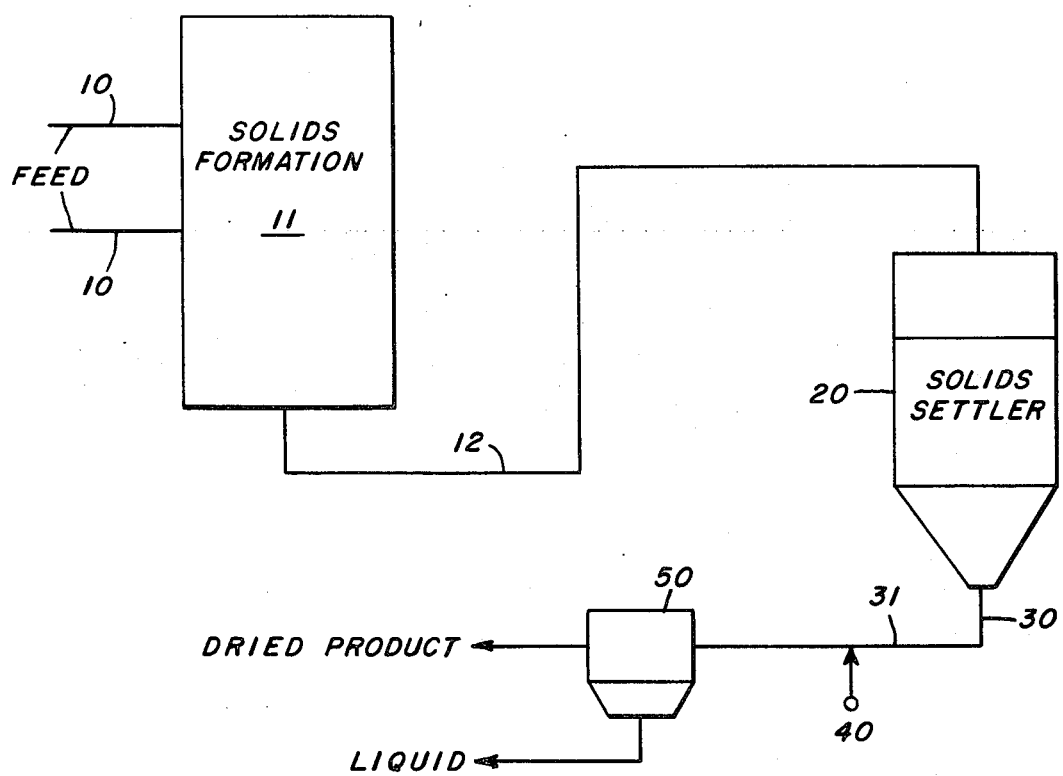
FIG. 1 is a schematic flow diagram of the process of this invention.

Mixtures of solids and liquids suitable for use in this invention include crystallizable and non-crystallizable solids in aqueous and/or organic liquids which are difficult to separate by settling and centrifugation. Such mixtures generally require a further drying stage after centrifugation in order to produce a solid product with a liquid content suitable for transportation, storage or use, etc. Examples of such mixtures are crystallizable aromatic organic compounds such as naphthalene in mother liquors such as tar oil (see U.S. Pat. No. 2,642,465); crystallizable salts in aqueous liquids, such as ammonium sulfates in mother liquors (see U.S. Pat. No. 2,424,206); insoluble mixed organic-inorganic solids such as sludges in waste water; insoluble inorganics such as flue dust in stack washing treatments.

This invention is of particular value when applied to mixtures of aqueous liquids and solids wherein it is desired to recover the solid with a relatively low moisture content, such as a moisture content, of less than 1% by weight. These solids are those which by nature of their chemical affinity for water or physical structure such as porosity tend to retain relatively large amounts of water even when centrifuged, i.e., solids which upon simple centrifugation have a residual moisture content of at least 2%. Examples of such solids are phosphates, sulfates, and nitrates in both water soluble and water insoluble forms. This type of solid should be contrasted with such materials as synthetic polymeric beads, e.g. polyethylene or polystyrene, which have neither a chemical composition nor physical structure such that water is readily retained by the solid. Crystallizable salts are particularly suitable for the practice of this invention, these salts may be water soluble oxygen, nitrogen, sulfur and/or halide containing salts, e.g. water soluble salts of ammonium or sulfate. Insoluble solids having a wide range of particle sizes and/or particle densities such as sludges recovered from water treatment systems or metallic oxides recovered from water washing of stack gases may also utilize this invention. These materials typically tend to retain water, for instance, sludge tends to retain 150% by weight of water; coal, 5 to 7% by weight of water; and ammonium sulfate, 2% by weight of water. By the practice of this invention, the water content of the dried solid may be less than 1% and even as low as 0.01% by weight. The aqueous liquids will in the case of soluble salts generally be supersaturated with respect to that salt. In the case of sludges, it is also desirable that as much water be recovered during the separation as is possible in order to effect economics in the treatment process. The aqueous liquid may, therefore, itself have other valuable components such as dissolved metal ions which it is desired to recover. Other ingredients may be present in the liquids which arise from the method by which the liquid is originally combined with the solid, e.g. in the washing of stacked gases to remove metallic oxides other oils and salts also may be brought down with the oxide material. As long as the liquid will be able to condensate the gas introduced into the system, it is suitable for the practice of this invention.

The condensable gases utilized in this invention will generally be of the same chemical nature as the liquid in the solids-liquid mixture. For aqueous liquids, the gas will be steam, for organic liquids, a corresponding organic vapor.

The ratio of solids to liquids will vary greatly in the various feed streams and as these feed streams in the separation zone are separated into a predominantly liquid region and a predominantly solid region. In the feed streams very low ratios may be present, such as 1% by weight of solids. In the separation zone, the predominantly solids region will be of sufficient mass to permit continuous withdrawal of solids against the pressure caused by introducing the condensable gas downstream of the withdrawal point. These solids ratios may be as high as 90% by weight.

Referring now to FIG. 1 for an illustration of the practice of the process of this invention, feed streams 10 are combined in the solids formation zone 11 to yield a mixture of solids and liquid. The feed streams may be separate chemical entities having as a result of their combination the formation of a salt, such as ammonia in coke oven gas and sulfuric acid to yield ammonium sulfate. These feed streams may also be the effluent from a water washing of stack gases which carries with it metallic oxides suspended in the liquid. The feed may also be a substantially insoluble suspension of siliceous materials such as sludge which is produced from water treatment systems. The mixture of solids and aqueous liquids thus formed flow by line 12 to a separation zone 20, here shown as a solids settler. In separation zone 20, the solid material separates from the aqueous liquid to form the predominantly solids region. The remaining liquid forms a predominantly liquid region. When the specific gravity of solids is sufficiently greater than that of the liquid, the solid separation zone may be a simple gravitational settling tank. Where such a difference of specific gravity is not present additional separation devices such as dewatering screens or centrifuges may be used to concentrate the solids in the liquid. From the separation zone, the mixture of solids and liquids are withdrawn in the generally vertical line 30 and then pass through a generally horizontal line 31. Condensable gases are introduced into these withdrawal lines by injector 40. Heat transferred from the condensable gas to the liquid will generally provide heat in separation zone 20. The injection of the condensable gas will also cause the retardation of liquid flow from the separation zone 20. The mixture of liquids and solids being withdrawn from the separation zone passes to a dryer 50. Preferably, this dryer will be a centrifuge which can give a dry product having a moisture content of less than 1%. Liquid will also be removed from dryer 50. By introducing the condensable gas through the injector 40, liquid flow from the separation zone 20 is retarded and this liquid will not have to be removed in dryer 50.

In addition, introduction of the condensable gas will cause pressure, density and temperature differentials within separation zone 20 which results in classifying particles by size so that the largest particles are, at least, in the solids region. In the case of soluble crystallizable solids, there will be an additional gravity and solubility differentials within the separation zone from the introduction of the condensable gas. These differentials will promote the growth of larger crystals and a more uniform range of crystal sizes in the predominantly solids region while maintaining the suspension of very fine crystals in the liquid.

Figure 5:
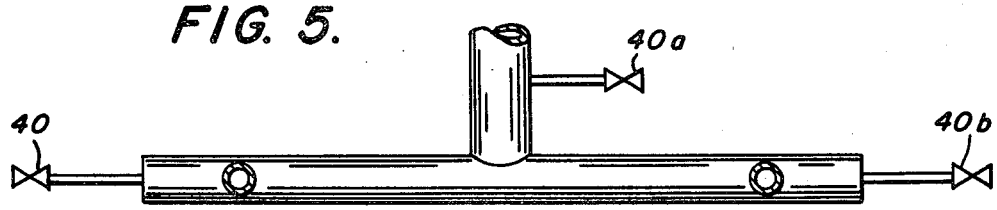
FIGS. 5 and 6 illustrate alternative dispositions of means for introducing condensable gases in the apparatus of FIG. 2.
Figure 6:
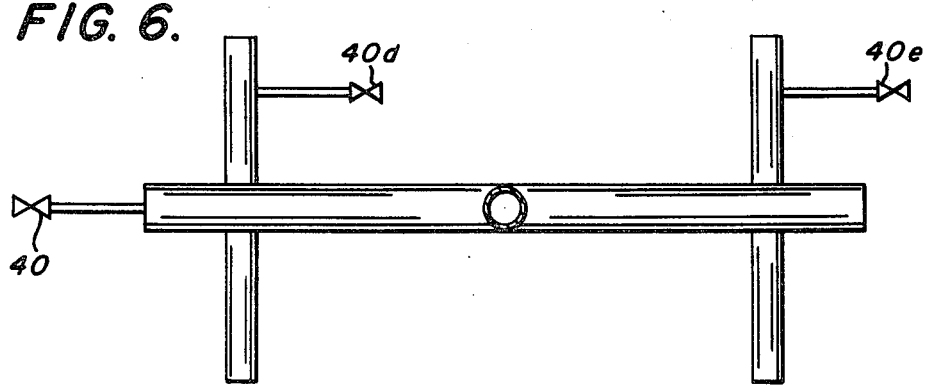
Figure 2:
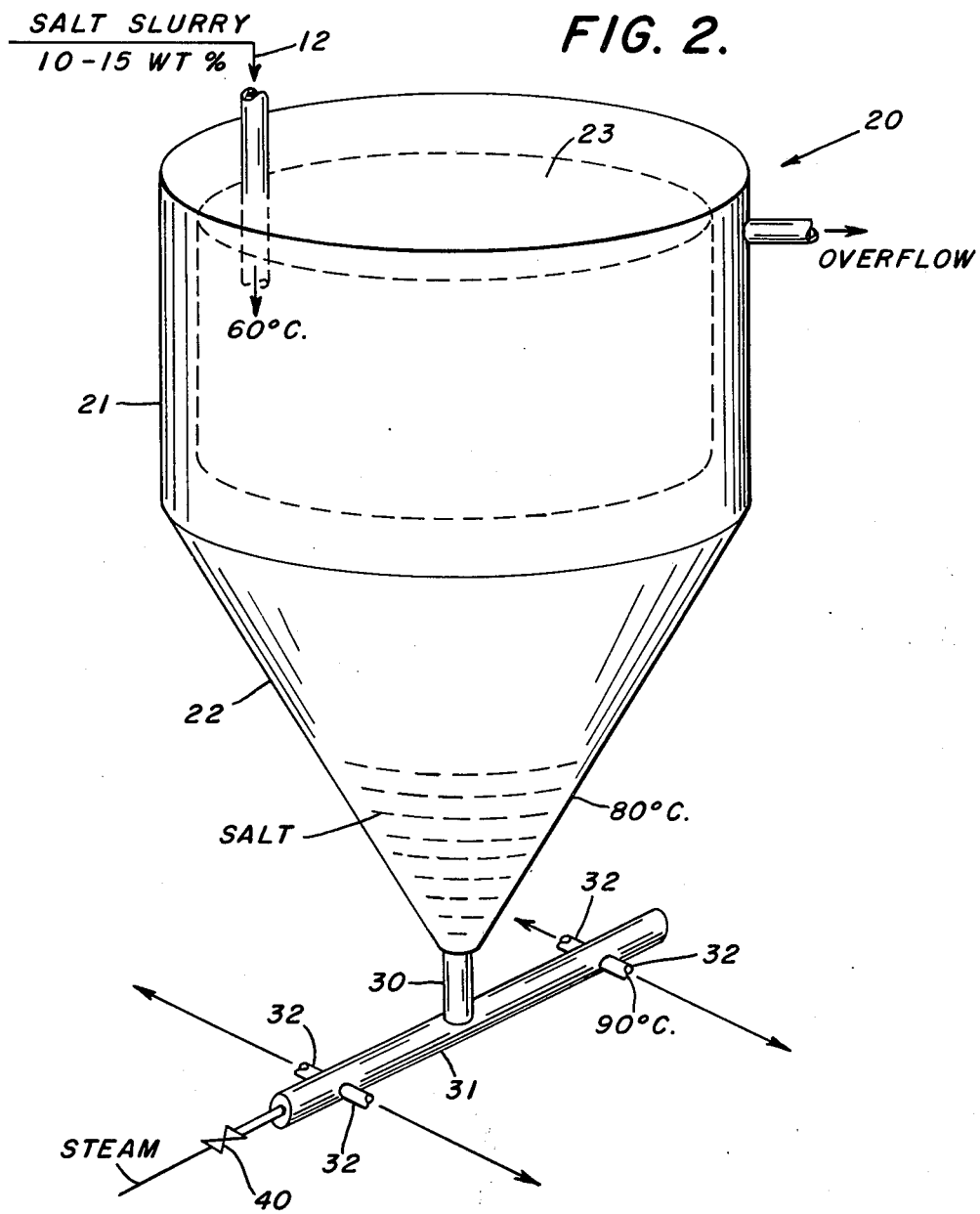
FIG. 2 is an isometric view of an apparatus incorporating the principles of this invention.
Figure 4:
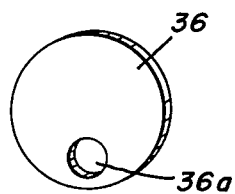
FIG. 4 is an isometric view of a control element in the means in FIG. 3.

Referring now to FIG. 2 for a description of an apparatus suitable for utilizing the principles of this invention, transfer line 12 introduces a mixture of liquid and solid into the separation zone 20. This is constructed with an upper cylindrical portion 21 communicating with a lower conical portion 22; interior of the upper cylinder is a baffle 23. This baffle keeps the inlet material separate from the overflow material going through the outlet 24. Solids tend to concentrate in the bottom of the lower conical portion 22 and form a head of solid material over the withdrawal line 30. Solids and liquids withdrawn from the solids region of the separator pass into the withdrawal line 30; it is generally a vertically disposed transfer line which communicates with a horizontally disposed transfer line 31. Distributor 32 from the horizontal transfer line carries the solids and liquids to the drying apparatus, not shown. Condensable gas is introduced into the horizontal transfer line by the injector 40. This injector will have a valve to regulate the flow of gas into the line. As shown in FIG. 5, a multiplicity of such injectors 40, 40A, and 40B, may be disposed in the withdrawal system. It has been found that positioning the injectors 40 in the horizontal transfer line 31 provides the lowest moisture content of the final dried product. Injectors may also be disposed in distributors 32 as shown in FIG. 6, elements 40, 40D, and 40E. Additional means may be provided in the horizontal transfer line 31 in the form of plates 36 (FIG. 4) having orifices 36A (FIG. 4) disposed as flow restrictors 34 for the exit line 35. These plates will tend to permit the underflow of solids through the orifice 36A which is disposed below the centerline of the plate while tending to retain condensable gas pressure in the horizontal transfer line. These additional means help to control the uniformity of composition of the ultimate dried product.

The following is an example of the practice of this invention as applied to the recovery of ammonia as ammonium sulfate from coke oven gas.

Figure 3:
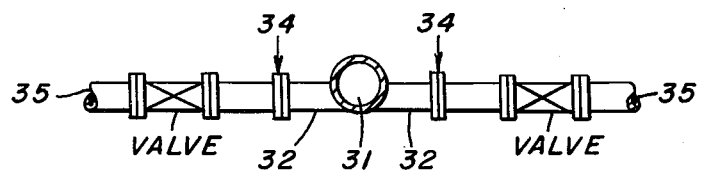
FIG. 3 is an elevation of a section of the apparatus in FIG. 2 showing additional means to promote separation of liquids and solids.

Coke oven gas (COG) is reacted with sulfuric acid in a spray contactor to yield an aqueous liquid containing ammonium sulfate crystals. This liquid has a solids content of from 5 to 15% ammonium sulfate crystal. From the contactor, it is introduced at a temperature of about 60°C into a separation zone as shown in FIG. 2. The temperature of the solution in the cylindrical portion of the separator is about 60°C. In the separator, ammonium sulfate crystals separate from the liquid and form a column of solid ammonium sulfate in the conical section of the separator. This ammonium sulfate salt is withdrawn from the bottom of the separator through a vertical line communicating with a horizontal transfer line. The liquid head from the overflow line to the horizontal transfer line is about 20'. Steam at pressures greater than the liquid head, especially 150 psig, is introduced into the horizontal transfer line. The rate of withdrawal of solids and liquids is 120 per minute of solid and 25 gallons per minute of liquid. Steam is introduced at the rate of 20 to 25 lbs. per minute. The mixture then has a temperature of about 90°C. Heat released from the condensed steam will raise the temperature of the composition in the conical leg of the separation zone to about 80°C. In the withdrawal line 31, the mixture flows through the distributors 32 and through the orifice structure 34 shown in FIG. 3. This then exits onto a centrifuge rotating at about 850 rpm, at which time the final dry ammonium sulfate product is obtained. Moisture contents of ammonium sulfate of less than 1% by weight are easily and readily obtained.

Figure 7:
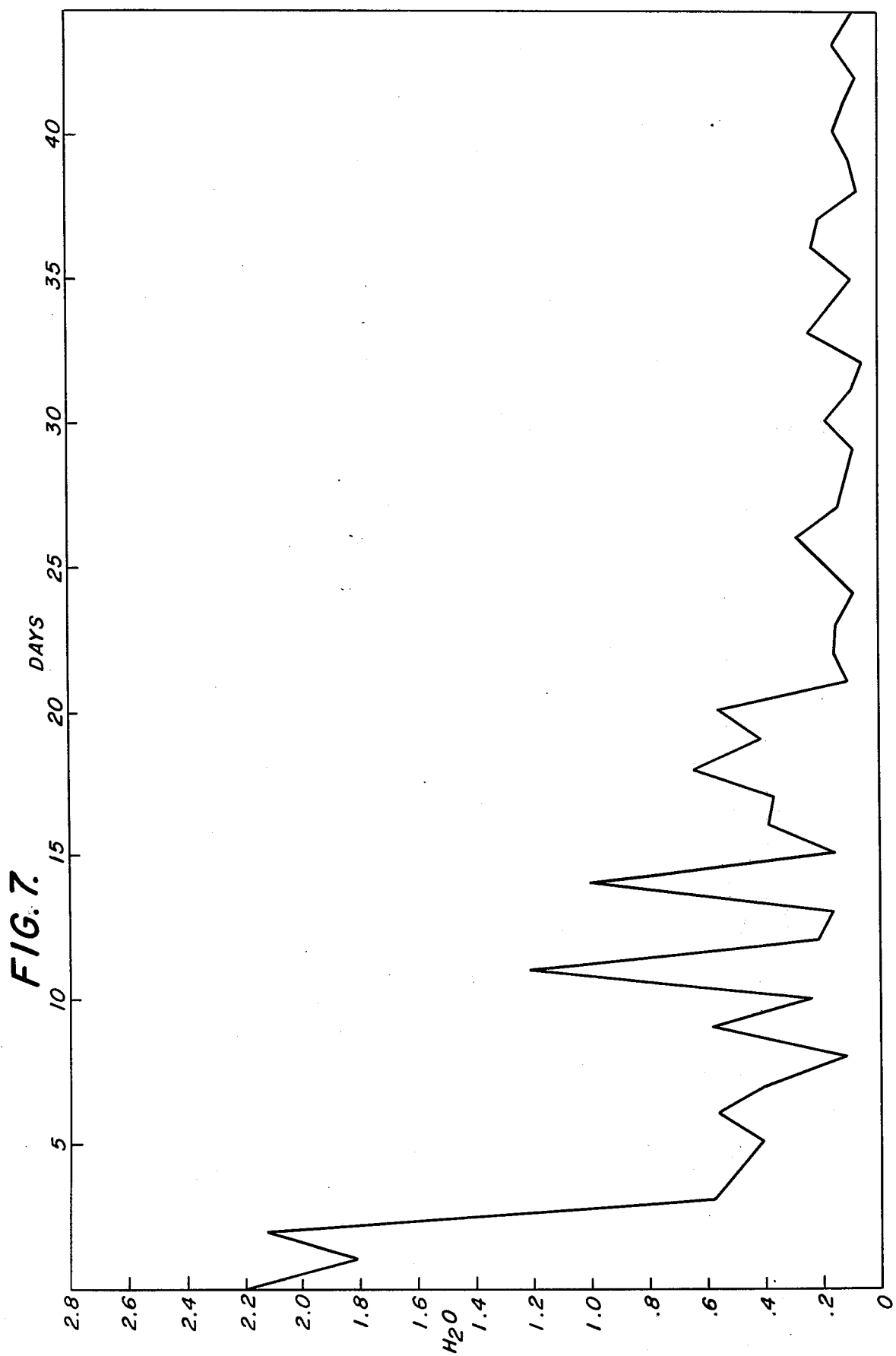
FIG. 7 illustrates the results obtained by practicing the invention in an apparatus such as illustrated in FIG. 2.

It has been found that the height of salt in the bottom of the conical leg of the separation zone should be maintained at a height of 4 to 5 feet for optimum control of the uniformity of moisture content in the final dried product. FIG. 7 is a graph illustrating the results obtained by the procedure of Example 1, in which average moisture content by weight of dry ammonium sulfate is plotted against operating time shown as % $H_2O$ on the ordinate for a period which included the use of this invention and shown as Days on the abscissa.

The initial portion of the curve from Day 0 to about Day 3 represents the procedure customarily followed for recovery of the sulfate salt by settling, and centrifugation. As centrifuged, the salt product has a moisture of 1.8 to 2.2% by weight of water. The steep decline in moisture content beginning about Day 3 coincides with the introduction of steam into the withdrawal line of the apparatus shown in FIG. 2. Thereafter, this steam injection continued through to Day 44. When a uniform height of salt in the separator was maintained from about Day 22, the moisture contents in the sulfate were in the region of 0.1 to 0.4%. Moisture contents of 1.8 to 2.2% shown in FIG. 7 illustrate conventional separation practice in which the injection of condensable gas is not used. By the introduction of the condensable gas the average moisture content was reduced below 1% as shown in FIG. 7 between about day 3 and about day 15. By maintaining the height of salt collected in the bottom of the separation zone at about 4 to 5 feet, I obtained consistent moisture contents of the dried salt product. This is shown in FIG. 7 in the region of about day 22 to about day 40. It is especially advantageous that the low moisture content of salt can be consistently obtained by merely centrifuging the material exited from the withdrawal lines.

Another benefit of this invention is that the sulfate is no longer the consistency of fine powder and need not be pelletized for subsequent dispersion in open fields. The voluminous dust clouds associated with flour sized ammonium sulfate obtained by prior art processes are eliminated. The recognizably greater particle size of ammonium sulfate produced by the practice of the method and use of the apparatus of this invention permits the distribution of ammonium sulfate salt in mixed fertilizer by open field applicators, which is the primary use of this sulfate material.

In addition, the handling properties of the dried solid have been improved. In the case of ammonium sulfate, this material is free flowing during conveying and can be stored for long periods of time in stockpiles without caking or agglomeration of the stockpile. Furthermore, the relatively low temperature at which the moisture level is obtained by the practice of this invention avoids the moisture-regain problem associated with prior art oven drying techniques. This is a signal advantage when moisture contents in the dried solid of less than 0.1%, particularly in the range of 0.02 to 0.05%, are desired from the practice of the invention.

The condensable gas should be at a pressure such that no undissolved gas is released into the separation zone which would cause foaming or other disturbance of the classifying mechanism. The pressure will vary with the height of liquid maintained in the separation zone. Enough steam should be supplied so that in the case of crystallizable salt, a temperature gradient can be maintained from the bottom of the separator to the top of the separator, thus causing the more concentrated hot aqueous liquid to move by convection to the top of the vessel where it will contact the cooler material and help promote the growth of uniform, larger sized crystals. By disposing the condensable gas injection downwardly of the withdrawal region from the separation vessel, agitation inside the vessel by heating means is avoided, and the consequent disturbance of the classifying mechanism inside the separation tank is eliminated. The maintenance of a temperature gradient by introduction of the condensable gas as has been described, promotes the growth of larger more uniform crystals which will, under the conditions of crystal growth, tend to exclude occlusions of water which would raise the moisture content of the crystalline material.

By providing the condensable gas in the withdrawal system as has been described, the liquid tending to escape with solids from the vessel is retained within the vessel of the separation zone. This permits a higher volumetric percentage of solids to be deposited into the dryer, and also permits recovery of more liquid in the overflow from the separation zone. In the case of materials such as metal oxides or sludges collected in an aqueous liquid, the liquid retention feature of the invention is particularly important in achieving a dry product by centrifugation.

This invention has been described by reference to specific processes and apparatus which best illustrate the practice of the invention. However, it should be clearly understood that other processes and apparatus which clearly utilize the principals herein described and as such, would be considered as equivalents by those skilled in the art are equally within the scope of this invention as described in the hereinafter appended claims.

I claim:
1. In the method for recovering ammonium sulfate from coke oven gas by forming a mixture of solid ammonium sulfate, and an aqueous ammonium sulfate liquid, the improvement comprising:
   a. subjecting said mixture to a separation zone for gravitational separation into a predominantly aqueous ammonium sulfate liquid region and a predominantly ammonium sulfate solids region, b. withdrawing from said solids region a stream of aqueous ammonium sulfate liquid and solid ammonium sulfate crystals, and introducing a condensable gas stream comprising steam at a point downstream of said point of withdrawal, said gas being at a pressure such that undissolved condensable gas is prevented from being released into said separation zone and condensing said gas in said withdrawn stream to retard liquid flow from said separation zone and thereby concentrate said sulfate crystals in said withdrawn stream, said solids region being of sufficient mass to permit withdrawal of said sulfate crystals against the pressure caused by introducing said condensable gas into said withdrawn stream, and c. recovering solid ammonium sulfate crystals by drying said withdrawn stream by centrifugation.

2. The process of claim 1 wherein said salt is dried to a moisture content of less than 1% by weight.

3. The process of claim 1 wherein said salt is dried to a moisture content of less than 0.5% by weight.

4. The process of claim 1 wherein said salt is dried to a moisture content of less than 0.3% by weight.

5. The process of claim 1 wherein said separation zone has a temperature gradient from about 60°C to about 80°C to provide a uniformly sized ammonium sulfate crystal as said solid.

6. The process of claim 5 wherein said temperature gradient is maintained by the amount of steam introduced downstream of said point of withdrawal.

7. The process of claim 6 wherein said steam has a pressure of at least 100 psig.

8. The process of claim 1 wherein said solids are maintained at a height in said separation zone sufficient to provide a uniform moisture content in the recovered solid product.

* * * * *

UNITED STATES PATENT OFFICE
CERTIFICATE OF CORRECTION

Patent No. 3,975,272  Dated August 17, 1976

Inventor(s) Claude E. Bole

It is certified that error appears in the above-identified patent and that said Letters Patent are hereby corrected as shown below:

Column 2, line 10, after "solids" should read --withdrawal--.

Column 3, line 11, "economics" should read --economies--.

Column 5, lines 32 and 33, should read --sulfate shown as % $H_2O$ on the ordinate is plotted against time for a period which included the--.

Column 5, line 38, after "moisture" should read --content--.

Signed and Sealed this

Seventh Day of December 1976

[SEAL]

Attest:

RUTH C. MASON
*Attesting Officer*

C. MARSHALL DANN
*Commissioner of Patents and Trademarks*